M. H. GREESON.
BALL COCK.
APPLICATION FILED NOV. 25, 1919.

1,384,450.

Patented July 12, 1921.
2 SHEETS—SHEET 1.

WITNESSES
George G. Myers.

INVENTOR
Merton H. Greeson,
BY
ATTORNEYS

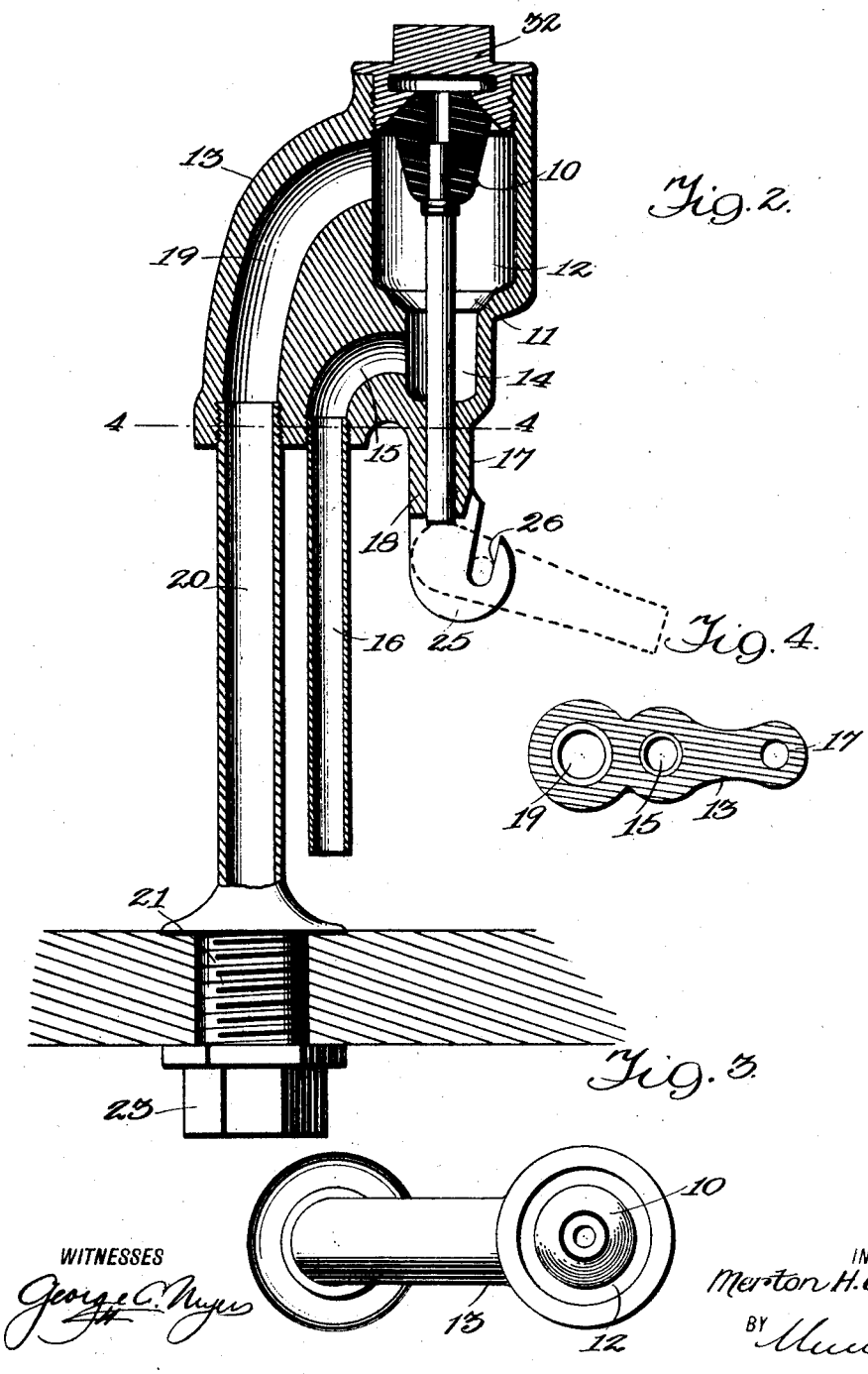

UNITED STATES PATENT OFFICE.

MERTON H. GREESON, OF TAMPA, FLORIDA.

BALL-COCK.

1,384,450.  Specification of Letters Patent.  Patented July 12, 1921.

Application filed November 25, 1919. Serial No. 340,551.

*To all whom it may concern:*

Be it known that I, MERTON H. GREESON, a citizen of the United States, and a resident of Tampa, in the county of Hillsborough and State of Florida, have made certain new and useful Improvements in Ball-Cocks, of which the following is a specification.

My present invention relates generally to ball cocks, the ordinary construction and uses of which are well known and is more particularly of the noiseless type described and claimed in my Patent 1271459, granted July 2, 1918, and upon which the present application is an improvement.

The primary object of my present improvements is the rearrangement and disposition of the parts, with the purpose in view of having the valve to seat not only in the direction of flow of water, but also in a downward direction so that it is capable of closing by its own weight, and will remain closed and tightly held by the water pressure and its own weight as long as unaffected by the float controlled connections.

A further object in connection with the ball cock of the above description is the provision of float controlled connections, and a mounting therefor so arranged that the float with its stem and the valve shifting head may be removed for purposes of repair whenever it is desired to do so, without affecting the valve in closed position.

With these objects among others, my invention in its most specific aspect resides in the features of construction, arrangement and operation to be now described with respect to the accompanying drawing forming a part of this specification, and wherein:

Fig. 2 is an enlarged vertical section through my improved ball cock with the float controlled connections removed;

Fig. 3 is a top plan view with the cap nut removed;

Fig. 4 is cross section on line 4—4 of Fig. 2;

Figure 1:
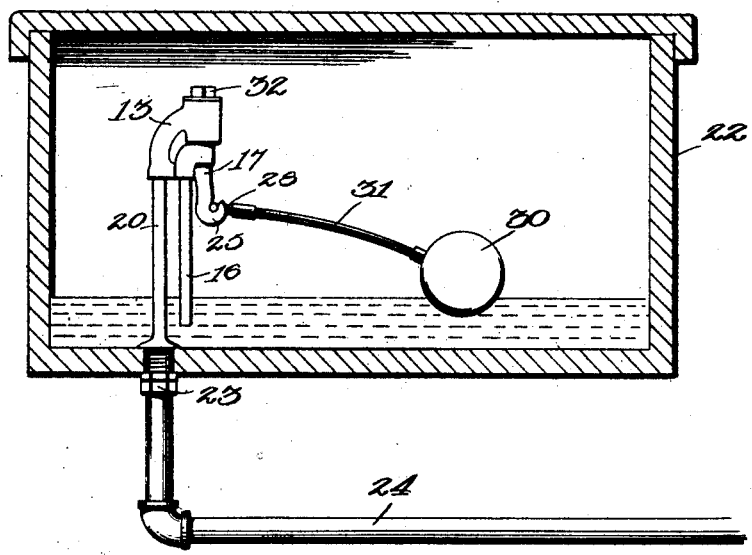
Figure 1 is a sectional view illustrating the practical application of my invention.
Figure 5:
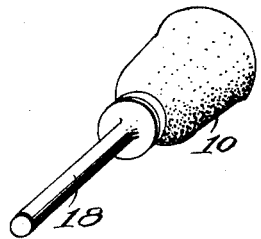
Fig. 5 is a detailed perspective view of the valve member and its stem.
Figure 7:
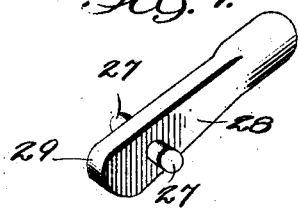
Fig. 7 is a detailed perspective view of the head end of the float stem.
Figure 6:
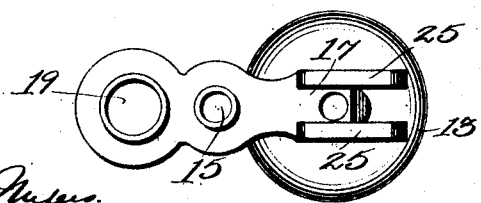
Fig. 6 is a bottom plan view of the valve casing.

Referring now to these figures, the automatically closing ball or valve member 10 is, in my present construction, shiftable downwardly to closed position upon a seat 11 formed around the lower portion of the enlarged valve chamber 12 of the valve casing 13. As seen particularly in Fig. 2 this valve seat is between the valve chamber 12 in which the ball 10 is movable, and a lower reduced portion 14 communicating with a curved outlet channel 15 into the outer end of which is threadedly connected the upper end of the outlet tube 16.

The valve casing 13 has a lower extension 17 approximately paralleling the upper portion of the outlet tube 16, at one side thereof, provided with a lengthwise bearing opening for the valve stem 18, at whose upper end the ball or valve member 10 is carried, the lower end of stem 18 projecting below the casing extension when the valve is in closed position on its seat 11.

Valve casing 13 is also provided with an intake channel 19 into the lower end of which the upper end of the intake tube 20 is threadedly connected, this intake tube 20 having a lower externally threaded portion 21 for passage through the base of a tank 22, and for the reception of a union 23 connecting the same with a supply pipe 24.

The lower extension 17 of the valve casing has spaced depending ears 25, each provided with an inclined slot 26 opening upwardly for the reception of laterally projecting trunnions 27 of the float stem head or lever 28, whose rounded extremity 29 works against the lower end of the valve stem 18 and acts as a cam thereagainst to lift the valve off of its seat when the float descends. For this reason the float, as seen at 30 in Fig. 1, and which may be of any suitable construction, is mounted at one end of its stem 31 at the opposite end of which the head or lever 28 is carried, and it is obvious that when the tank is in normally filled condition, with the valve 10 closed, it is simply necessary to further raise the float 30 and withdraw the same from between the depending ears 25.

At its outer end the valve casing 13 is internally threaded around the upper portion of the valve chamber 12, for the reception of a threaded cap nut 32, so that the valve may be readily reached and withdrawn for purposes of repair and substitution without demounting the valve casing, the communicating end of the intake channel 19 being likewise readily reached in cases where it may be necessary to plug the same.

It is obvious that, seating as it does downwardly against its seat and in the direction of flow of water through the valve casing, the valve or ball 10 will be held closed both by virtue of its own weight, and the pressure of water above the same and within the valve chamber 12, thus permitting the float and its connections to be removed as previously described, without in any way affecting the valve. My invention thus presents a construction which is both effective and efficient in use, which permits of ready accessibility to its several operating parts, and which in this way provides for easy convenient repair and substitution.

I claim :—

1. The combination with a casing, having a valve seat, and inlet and outlet means on opposite sides of said valve seat, a valve adapted for contact with said seat and having a depending stem, the lower portion of said casing being provided with a depending tubular guide slidably receiving said stem, a pair of spaced parallel ears depending from said tubular guide and provided with inclined slots opening out through the upper portions of the ears, a lever having its rear end rounded to form a cam engaging the lower end of said depending stem, a pair of trunnions extending from said lever forwardly of said cam and detachably arranged within said slots whereby the lever may be readily detached from said ears, and a float carried by said lever.

2. The combination with a casing having a valve seat, and inlet and outlet means on opposite sides of said valve seat, a valve adapted for contact with said seat and having a depending stem, the lower portion of said casing being provided with a depending tubular guide slidably receiving said stem, a pair of spaced parallel ears depending from said tubular guide and provided with inclined slots, opening out through the upper portions of the ears, a lever having its rear end rounded to form a cam engaging the lower end of said depending stem, and a pair of trunnions extending from said lever forwardly of said cam and detachably arranged within said slots whereby the lever may be readily detached from said ears.

MERTON H. GREESON.